United States Patent
Patsenker et al.

(10) Patent No.: US 7,711,705 B1
(45) Date of Patent: May 4, 2010

(54) METHODS AND APPARATUS FOR PROCESSING PARTITIONED CHANGES

(75) Inventors: Svetlana Patsenker, Wayland, MA (US); Boris Farizon, Westborough, MA (US); Samuil Shmuylovich, Framingham, MA (US); Anoop George Ninan, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 947 days.

(21) Appl. No.: 11/476,523

(22) Filed: Jun. 28, 2006

(51) Int. Cl.
*G06F 7/00* (2006.01)
(52) U.S. Cl. ..................... 707/613; 707/615
(58) Field of Classification Search ......... 707/100–102, 707/200–206
See application file for complete search history.

(56) References Cited

U.S. PATENT DOCUMENTS

2003/0065902 A1* 4/2003 Shiga et al. ................. 711/170
2003/0221010 A1* 11/2003 Yoneya et al. ............... 709/227
2006/0224639 A1* 10/2006 Watanabe et al. ........... 707/201

* cited by examiner

Primary Examiner—Wilson Lee
(74) Attorney, Agent, or Firm—Chapin IP Law, LLC (57) ABSTRACT

In a storage area network, agents provide transactions of data sets containing updates to manageable entities in a SAN. A SAN server avoids intermittent dissemination of events pertaining to a single transaction by storing events in a cache until completion of all subtransactions in the transaction, and then disseminating all events pertaining to the transaction. Transactions are broken down into update sections, each containing one or more subtransactions collectively defining the entire transaction. Update sections corresponding to the transaction are tagged with a section ID. Events indicating completion of processing of the update section are identified by the section ID, and suppressed temporarily by storing them in the event cache pending completion of the transaction. Other events not matching a tagged section ID are allowed to disseminate. Upon completion of the transaction, events for all section IDs corresponding to the transaction are disseminated from the cache.

12 Claims, 7 Drawing Sheets

METHODS AND APPARATUS FOR PROCESSING PARTITIONED CHANGES

BACKGROUND

In a storage area network (SAN), a SAN management application monitors and manages manageable entities in the SAN. The manageable entities include storage arrays, connectivity devices, and hosts. Typically, software components known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is responsive to a console having a graphical user interface (GUI) for receiving and displaying operator parameters with a SAN operator.

The agents periodically transmit management information to the management application. The management information pertains to the manageable entities that the agent is monitoring, and is employed to update and maintain a managed object database (MODB). The managed object database stores collective information on the manageable entities across the SAN for responding to queries from the management application. Such queries include available storage, used storage, configured and in-use devices, and frequency of usage, for example, and is employed to generate reports on trending analysis, current utilization, usage projections, and other reporting, accounting and maintenance operations.

In a large SAN, the management information transmitted from the agents can be substantial. For example, a storage array has many individual storage devices, such as disk drives, each having corresponding management information. In particular, information concerning a large storage array having many storage devices may be unwieldy and time-consuming to process. Typically, therefore, the management application processes the management information from the agents at off-peak hours, such as overnight.

SUMMARY

In the storage area network (SAN), agents monitor the storage arrays for management information concerning each of the storage devices (e.g. disk drives) on the storage array. Modern storage arrays can have as many as 64,000 (64K) storage devices. The agents transmit the management information to the management application as a data pull transaction, or change set, reflecting changes to each of the storage devices in the storage array. The resulting change set of management information can be substantial. Attempts to process a large data pull transaction (transaction), therefore, can have a disproportionate effect on the management application, and can result in bottlenecks and locking contention during processing, degrading overall system performance. Accordingly, large transactions may be partitioned into a series of smaller subtransactions (data sets), such as those disclosed in copending U.S. patent application Ser. No. 11/393,110, filed Mar. 30, 2006, "METHODS AND APPARATUS FOR PERSISTING MANAGEMENT INFORMATION CHANGES", incorporated herein by reference.

The agents, therefore, transmit the transaction as a series of update sections (partitions), each including one or more subtransactions collectively defining the entire transaction. The management application employs one or more store processes to process each of the update sections by updating the corresponding records in the managed object database. Each of the subtransactions generates events attesting to the corresponding update performed in the managed object database. However, the transaction corresponding to a particular storage array represents an atomic occurrence (i.e. should happen as a single action). Other processes in the management application may be listening for events pertaining to the managed object database updates. It is beneficial if these processes do not receive only a portion of events attesting to updates in a transaction, but rather that all events pertaining to a particular transaction are disseminated at the same time. Each update section in a transaction should be processed concurrently (or nearly concurrently) with the other update sections in the transaction, and the resulting events disseminated as an atomic set of events.

Configurations disclosed herein are based, in part, on the observation that disseminated events corresponding to earlier processed update sections may present inconsistencies until later processed update sections disseminate corresponding, complementary, and/or related events, particularly if an intermittent disruption impedes timely processing of all update sections (i.e. crash, network failure, etc.). For example, events may pertain to the addition of a storage device to a storage array. A particular event pertains to the storage device, and another event pertains to the storage array that received the storage device. Dissemination of only the storage device event may result in an ambiguity that a storage device was added, but be unclear as to which storage array received it.

Accordingly, configurations herein substantially overcome the shortcomings presented by intermittent dissemination of events pertaining to a single transaction by storing events in a cache until completion of all subtransactions in the transaction, and then disseminating all events pertaining to the transaction. Transactions are broken down into update sections, each containing one or more subtransactions collectively defining the entire transaction. Update sections corresponding to the transaction are tagged with a section ID, collectively corresponding to a batch ID denoting the transaction. Events indicating completion of processing of the update section are identified by the section ID, and suppressed temporarily by storing them in an event cache pending completion of the transaction. Other events not matching a tagged section ID are allowed to disseminate. Upon completion of the transaction, events for all section IDs corresponding to the transaction are disseminated from the cache. An optimizer aggregates multiple events pertaining to the same storage device to avoid redundant and moot events. In this manner, events pertaining to an atomic transaction are queued in the cache until the transaction processing is complete, and then released as an atomic set of events.

In further detail, the method of processing event data in a storage area network (SAN) as disclosed in an exemplary manner below includes receiving an update section, in which the update section includes at least one subtransaction of a transaction, and processing the update section in a managed object database, the managed object database being operable to process a plurality of the update sections collectively defining the transaction. The method suppresses events indicative of the update section pending completion of each of the update sections corresponding to the transaction, such that the suppressed events are operable to be released upon processing of all update section in the transaction.

Each of the update sections results in at least one change to the managed object database, which generates an event for each such change in the managed object database. A database listener suppresses, if the event corresponds to completion of processing an update section, propagation of the event, and propagates, if the event does not correspond to an update section, the event to registered processes adapted to receive the event. The DB listener receives a transaction completion indicating completion of each of the update sections in the transaction, and then propagates each of the suppressed events corresponding to the transaction.

In the exemplary configuration, the received update sections are indicative of updates to at least one storage device in a storage array, in which the update sections include one or more subtransactions of a transaction. The update section, therefore, corresponds to a portion of a transaction, such that the transaction is operable to be reported as an atomic occurrence.

For both transaction related update sections (partitioned changes) and other event driven processes, the DB listener receives a registration request from a process. The registration request includes an event type or other indicator that the requesting process is listening for, and detects occurrences of the listened-for event matching the event type in the registration request. The DB listener selectively transmits the listened-for event based on whether the event corresponds to an update section.

In the exemplary arrangement disclosed herein, suppressing includes storing events in a queuing area, or cache, and waiting for an indication of completion of each subtransaction defining the transaction. The management application then releases suppressed events from the queuing area for dissemination upon receipt of the indication of completion.

The indication of completion of each subtransaction, collectively aggregated for all subtransactions (update sections) may be the notification of transaction completion from an agent. Processing includes gathering, from an agent in communication with a storage array, each of the subtransactions occurring at the storage array, and building a series of update sections comprising a transaction, such that the series of update sections collectively include each of the gathered subtransactions. The agents send each of the update sections included in the transaction, and after sending all update sections for a transaction, send an indication of transmission completion of each of the update sections included in the transaction.

In the exemplary configuration, each of the subtransactions corresponds to a unit of work performed by updating the managed object database, in which each unit of work defines an atomic activity within the managed object database. An application programming interface (API) is employed for defining a batch ID corresponding to a transaction, and associating each update section of the transaction with a section ID corresponding to the batch ID. The DB listener then suppresses events corresponding to the transaction based on the batch ID, and releases events corresponding to the batch ID upon receiving the transaction completion indicative of completion of the transaction (i.e. all update sections) corresponding to the batch ID. A batch section mapper stores a unit of work (i.e. section ID) associated with each update section for each update section in the transaction, and identifies suppressed events from the stored units of work associated with the batch ID.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a storage area network, the management application on the server receives event notifications attesting to changes made to various storage arrays. The set of changes (events) corresponding to a particular storage array are intended to be processed as an atomic occurrence. In a partitioned (subdivided) update, disseminated events corresponding to earlier processed update sections may present inconsistencies until later processed update sections disseminate corresponding events. It would be beneficial to provide atomic notification of changes resulting from a single transaction of changes. Accordingly, configurations herein substantially overcome the shortcomings presented by intermittent dissemination of events pertaining to a single transaction by storing events in a cache until completion of all subtransactions in the transaction, and then disseminating all events pertaining to the transaction. Transactions are broken down into update sections, each containing one or more subtransactions collectively defining the entire transaction. Update sections corresponding to the transaction are tagged with a section ID. Events indicating completion of processing of the update section are identified by the section ID, and suppressed temporarily by storing them in an event cache pending completion of the transaction. Other events not matching a tagged section ID are allowed to disseminate. Upon completion of the transaction, events for all section IDs corresponding to the transaction are disseminated from the cache. An optimizer aggregates multiple events pertaining to the same storage device to avoid redundant and moot events. In this manner, events pertaining to an atomic transaction are queued in the cache until the transaction processing is complete, and then released as an atomic set of events.

Figure 1:
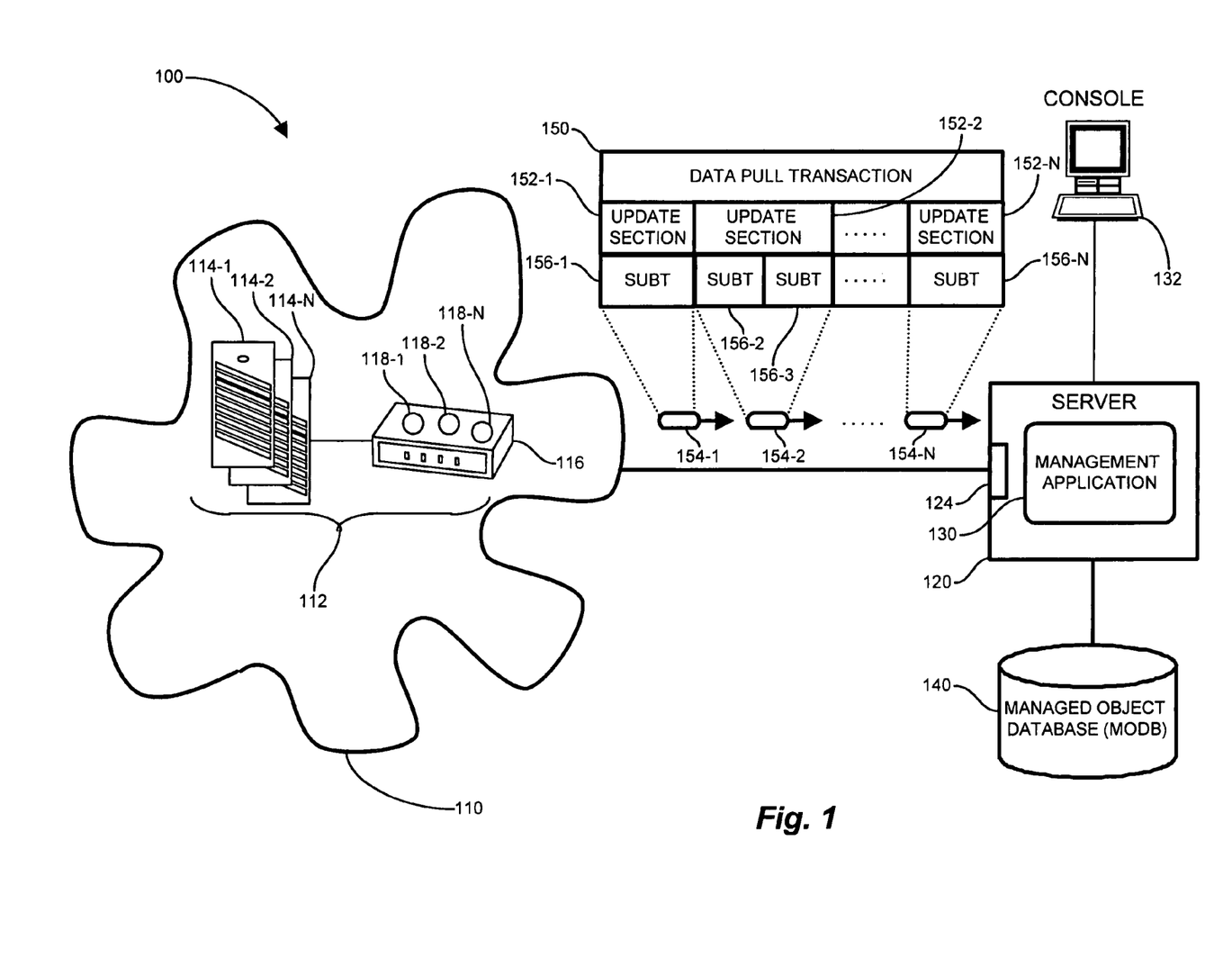
FIG. 1 is a context diagram of an exemplary managed information environment suitable for use with the present invention.

FIG. 1 is a context diagram of an exemplary managed information environment suitable for use with the present invention. Referring to FIG. 1, the managed information environment 100 includes a storage area network 110 for providing information storage and retrieval services to a user community (not specifically shown), responsive to a server 120. The server 120 has a management application 130 responsive to a console 132 for monitoring and managing the storage area network 110. The storage area network 110 includes a plurality of manageable entities 112 in communication with the management application 130 via a SAN interface 124 for providing the data storage and retrieval services. The manageable entities 112 include storage arrays 114-1.114-N (114 generally) and hosts 116, interconnected by connectivity devices (not specifically shown) collectively defining the infrastructure of the SAN 110. The storage arrays 114 each include a plurality of storage devices 115, such as disk drives (FIG. 3, below) for storing information. The hosts execute agents 118-1 . . . 118-N (118, generally), typically software processes, responsible for monitoring and managing the individual storage arrays 114. The agents 118 periodically transmit a data pull transaction 150 to the management application 130 indicative of activity in a particular manageable entity 112, or storage array 114, in this example.

The management application 130 also connects to a managed object database 140 for maintaining operating statistics of the manageable entities 112. The management application 130 employs the data pull transactions 150 (transactions, hereinafter) for updating the managed object database 140 to maintain an accurate repository about the manageable entities 112 in the SAN 110. The management application 130 employs the managed object database 140 for operations such as queries from the operator console 132, report generation, and other administrative details of the manageable entities 112. As indicated above, the agents 118 subdivide the data pull transactions 150 into a series of update section messages 152-1 . . . 152-N (152 generally), or data service message, each transmitted as a separate update section 154-1.154-N (154 generally). Each update section 154 includes one or more subtransactions 156-1.156-N (156 generally), collectively representing the entire data pull transaction 150.

Figure 2:
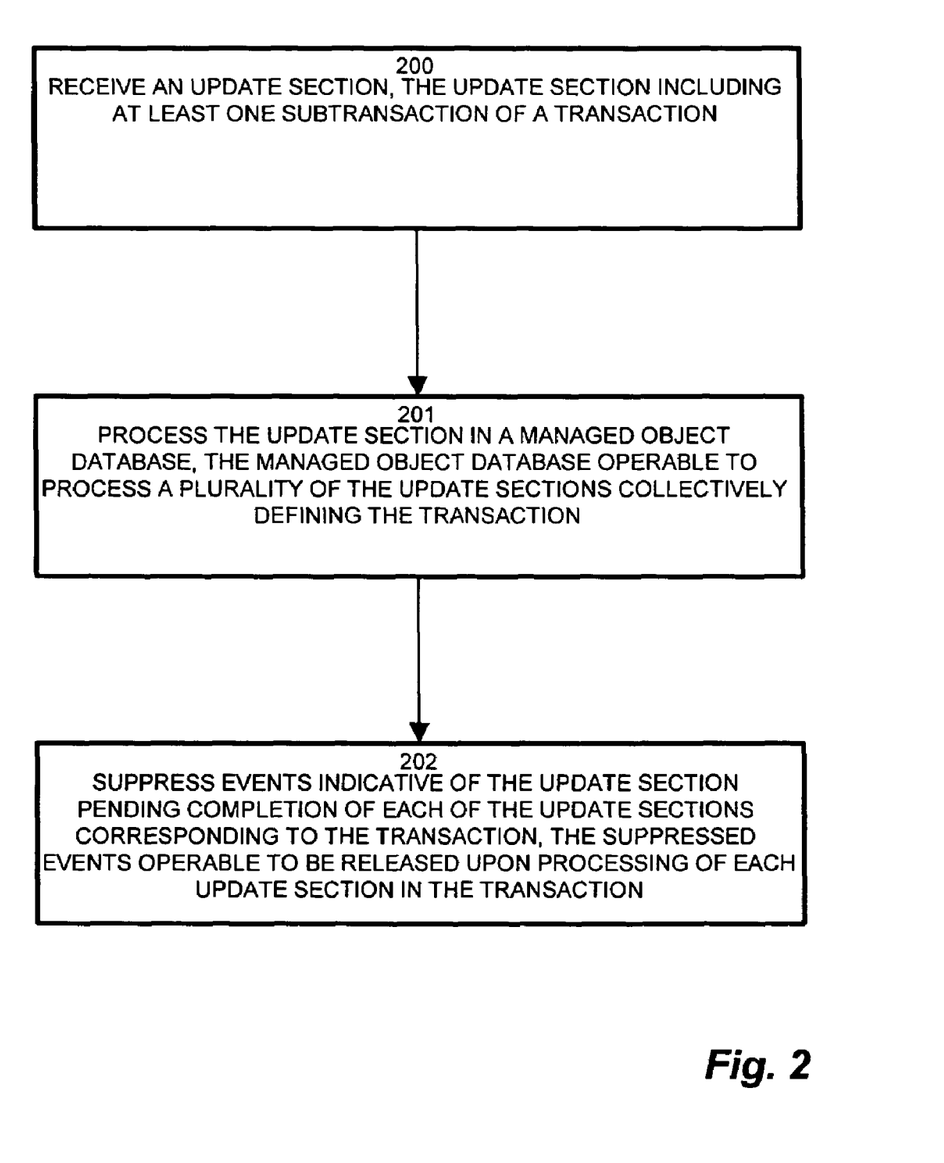
FIG. 2 is a flowchart of transaction processing in the environment of FIG. 1.

FIG. 2 is a flowchart of transaction processing in the environment of FIG. 1. Referring to FIGS. 1 and 2, the method of processing event data in a storage area network 110 (SAN) as defined herein includes, at step 200, receiving an update section 154, in which the update section 154 includes at least one subtransaction 156 of a transaction 150. The transaction 150 collectively includes a set of database changes taken over a time interval, such as daily, for storage devices 115 in a storage array 114. For example, each subtransaction 156 may pertain to changes made to a particular storage device 115. As depicted at step 201, the server 130 processes the update sections 154 in the managed object database 140, in which the managed object database 140 is operable to process a plurality of the update sections collectively defining the transaction 150. At step 202, a DB listener 160 in the server 130 suppresses events 180 (FIG. 3, below) indicative of the update section 154 pending completion of each of the update sections 154 corresponding to the transaction 150, such that the suppressed events are operable to be released upon processing of each update section message 152 in the transaction 150. In the exemplary configuration, event repository (182, FIG. 3, below) stores the suppressed events until the entire transaction 150 is processed (i.e. stored) in the database 140. The event repository 182 may be a cache, queue, or other storage medium for temporarily storing the events generated as part of the transaction 150, such that entities (processes) registering for (receiving) transaction events receive events as an atomic set of database updates, mitigating the likelihood of a process receiving only a partial set of updates from a transaction that results in an inconsistent or undesirable state.

Figure 3:
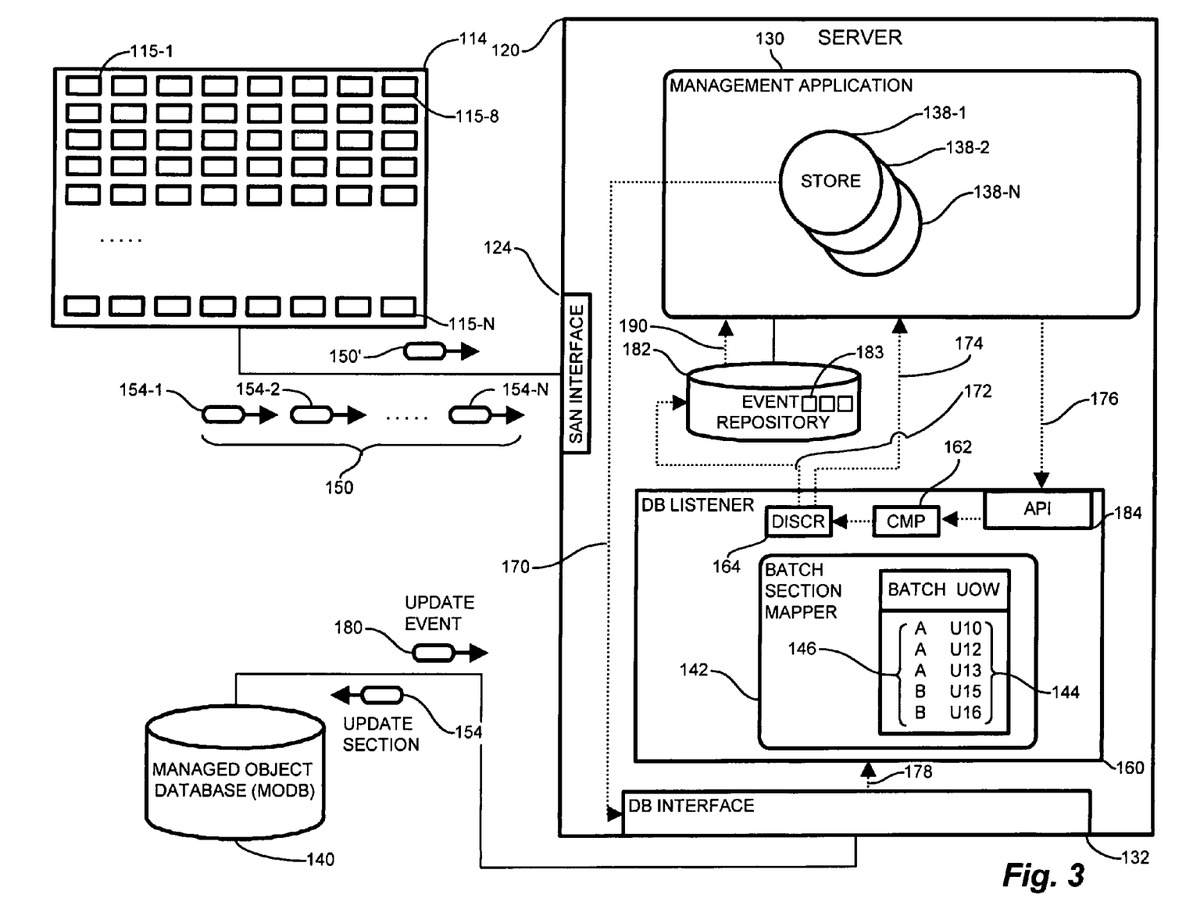
FIG. 3 is a block diagram of an exemplary configuration depicting transaction processing as in FIG. 2.
Figure 4:
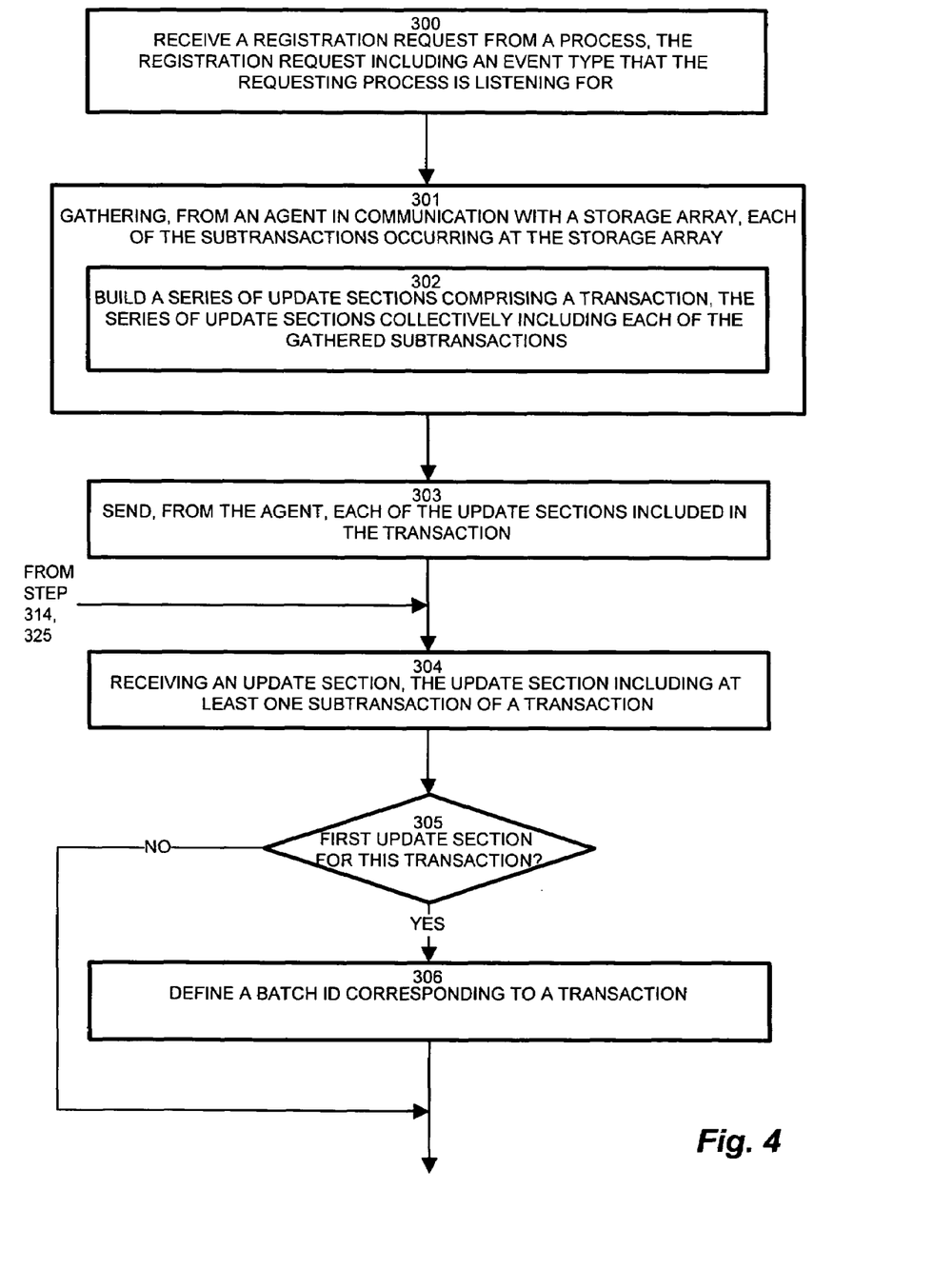
FIGS. 4-7 are a flowchart of transaction processing in the configuration of FIG. 3.
Figure 5:
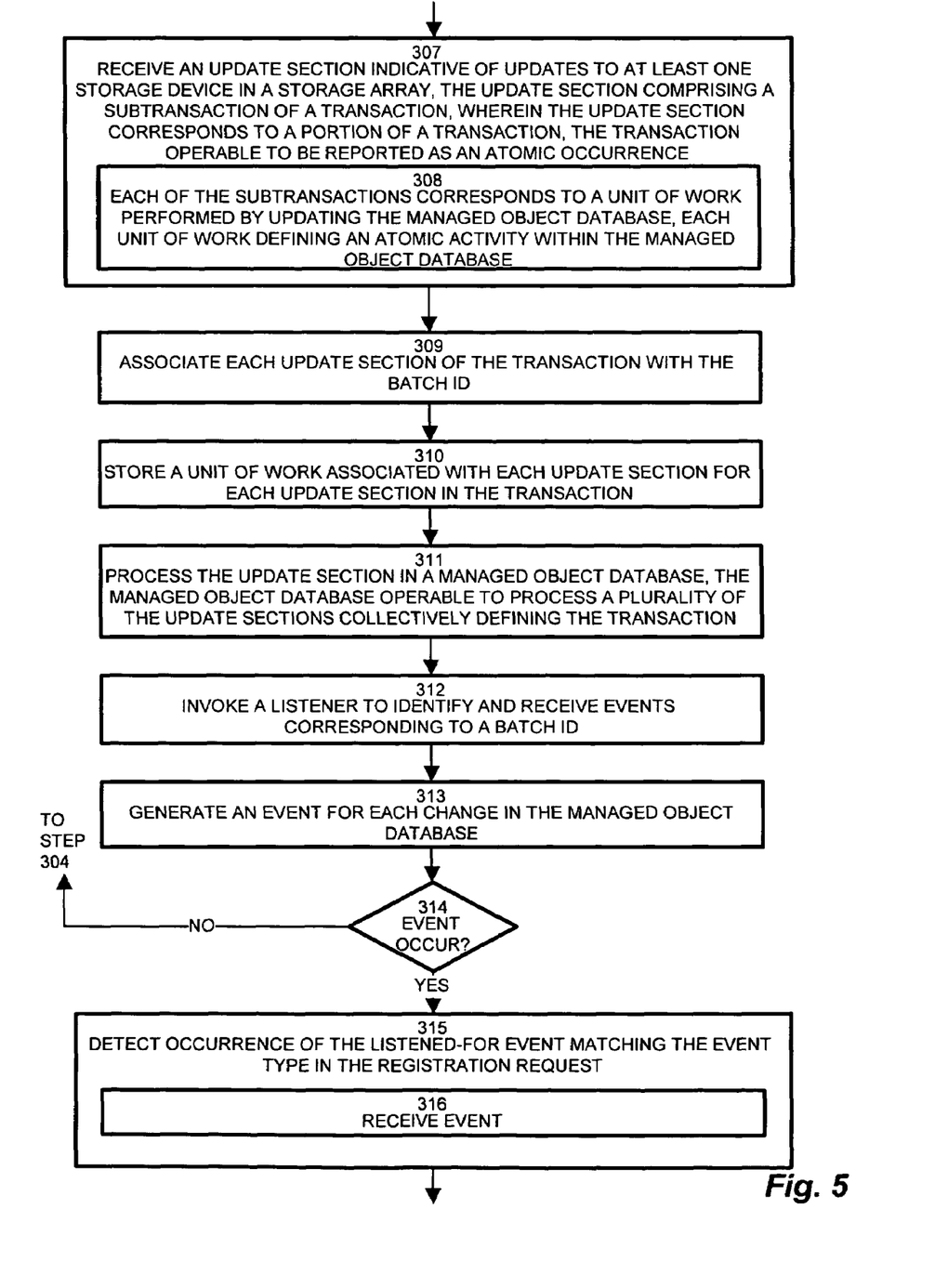
Figure 6:
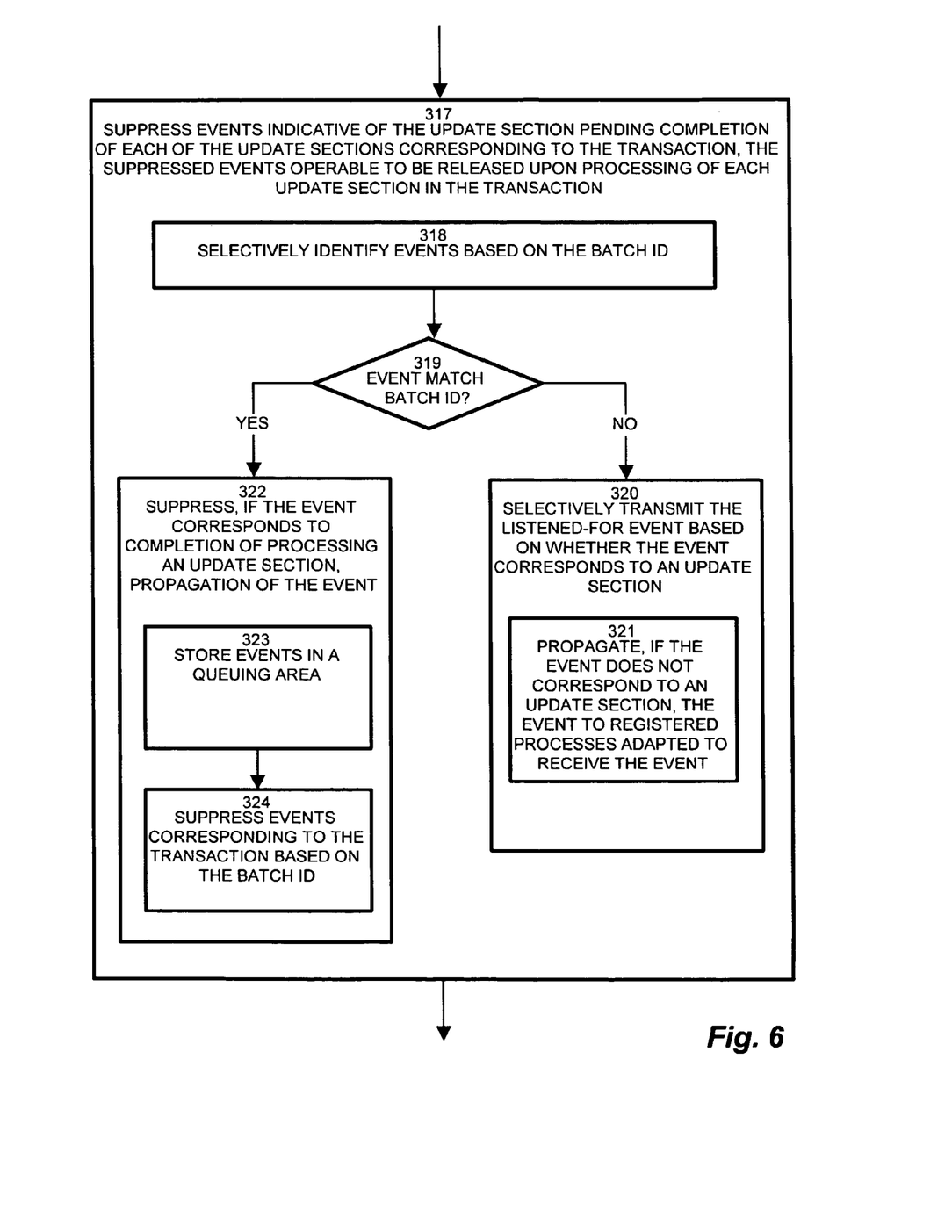
Figure 7:
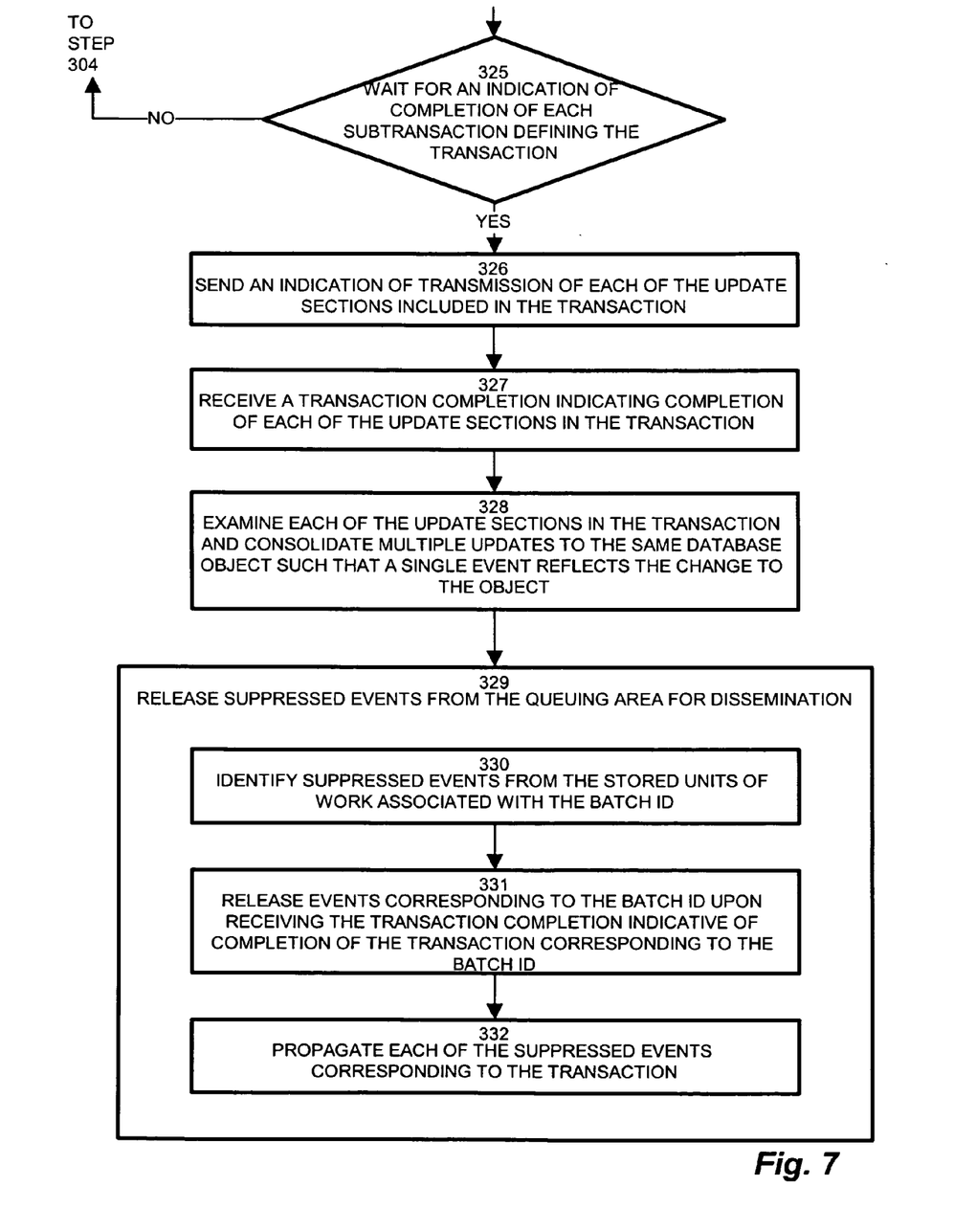

FIG. 3 is a block diagram of an exemplary configuration depicting transaction processing as in FIG. 2. Referring to FIGS. 1 and 3, in a typical configuration, each storage array 114 in communication with the server 120 includes a plurality of storage devices 115-1 . . . 115-N (115, generally). Each of the storage arrays 114 is monitored by one or more store processes 138-1 . . . 138-N (138 generally). The store processes 138 receive the update sections 154, and store the corresponding changes in the managed object database 140 via a DB interface 132, as shown by arrow 170. Each update section 154 typically includes updates corresponding to one or more storage devices 115, also known generally as storage objects.

Each update section 154 triggers a resulting update event 180 upon making changes to the database 140. A database listener 160 receives the events triggered by the update sections 154 via the database interface 132, as shown by arrow 178. Various processes in the management application 130 register with the DB listener 160 to receive notification of the update events 180 as well as other events occurring via the server 120. In accordance with configurations herein, events triggered by update sections 154 of a transaction 150 are suppressed in an event cache (repository, FIG. 3, 182) until all update events 180 for a particular transaction 150 are received, thus indicating that the managed object database 140 has applied the entire transaction 150.

The DB listener 160 identifies events 180 corresponding to update sections 154 by screening, or filtering the captured events. A comparator 162 identifies events 180 which are listened for by comparing the type of event to the registered events being listened for. A discriminator 164 discriminates the listened for events 180 which correspond to update sections 154 of a transaction 150. The discriminator 164 stores the update section events in an event repository 182, shown by arrow 172, while other events are allowed to propagate to the registered recipient in the management application 130, shown by arrow 174.

Each update section is identified by a unit of work 144, and each transaction is identified by a batch ID 146. The database listener 160 receives the unit of work (UOW) 144 identifier of each update section 154 via an application programming interface (API) 184 from the management application 130. Alternatively, other registration and notification schemes may be employed. In the exemplary configuration, the database listener 160 maintains a batch section mapper 142. The batch section mapper 142 maintains a mapping of unit of work (UOW) entries 144 of each update section 154 to a batch entry 146, corresponding to the transaction 150 of which the update sections are a part of. The DB listener 160 receives the UOWs 144 of events to listen for via the API 184, invoked from the management application 130, shown by arrow 176, and suppresses such events 183 in the event repository 184. Upon completion (DB processing) of all events 180 in a particular transaction 150, the batch ID 146 is employed to release all suppressed (cached) events 183 corresponding to that transaction, as will now be discussed in further detail with respect to FIGS. 4-7.

FIGS. 4-7 are a flowchart of transaction processing in the configuration of FIG. 3. Referring to FIGS. 1 and 3-6, at step 300, the server 120 receives a registration request from a process, such that the registration request includes an event type that the requesting process is listening for. In the SAN 110, various events are propagated. Processes register an interest in a particular event type if they are interested in receiving notifications about occurrences of that type of event. Events pertaining to update sections comprising a transaction 150 are flagged to determine if they are to be suppressed pending transaction completion. Other events are permitted to propagate.

Each transaction 150 contains updates for a particular storage array 114. An agent 118 responsible for the storage array 114 is in communication with the storage array, and gathers each of the subtransactions 156 occurring at the storage array 114, as depicted at step 301. At step 302, the agent 118 builds a series of update sections 154 comprising a transaction 150, such that the series of update sections 154 collectively including each of the gathered subtransactions 156. Transactions 150 may be of a substantial size, particularly with a large storage array. For this reason, transactions 150 are broken into a series of subtransactions 156, each in an update section 154, to avoid overburdening the server with a single large update.

Periodically, typically according to predetermined (i.e. nightly) intervals as described above, the agent 118 sends each of the update sections 154 included in the transaction 150, as depicted at step 303. The server 120 receives each of the update sections 154-N, such that each update section 154 includes at least one subtransaction 156 of a transaction 150, as shown at step 304. The server 120 tracks and groups the update sections 154 according to the transaction 150. Upon receipt of an update section 154, the management application 130 in the server 120 checks to see if this is the first update section 154 for this transaction 140, as shown at step 305. In the exemplary configuration, the actual checking that occurs is whether the transaction 150 belongs to a batch. As discussed further below with respect to the API 184, the batch is created before by startEventBatch method and each successive section 154 is added by addBatchSection. The UOW 144 is the identifier of the batch section (entry) 146. Accordingly, in particular configurations employing the API 184, the UOW can be checked on being a section in a batch. If so, then the management application 130 defines a batch ID corresponding to the transaction 150, as depicted at step 306. In the exemplary configuration, the management application 130 invokes the API 184 to begin a batch of update sections 154 (batch section) corresponding to a transaction 150, discussed further below.

The management application 130 therefore receives the update section 154 indicative of updates to at least one storage device 115 in a storage array 114, such that the update section includes one or more subtransactions 156 of a transaction 150, as disclosed at step 307. The update section 154 corresponds to a portion of a transaction 150, in which the transaction 150 is operable to be reported as an atomic occurrence following completion of all update sections 154 (subtransactions 156) of the transaction.

In the exemplary configuration, each of the subtransactions 156 corresponds to a unit of work (UOW) 144 performed by updating the managed object database 140, in which each unit of work 144 defines an atomic activity within the managed object database 140, as shown at step 308. The UOW 144 is employed by the API 184 in later disseminating events 183 corresponding to the update section 154 upon completion of processing the transaction 150. The management application 130 associates each update section 154 of the transaction 150 with a batch ID 146 identifying the transaction 150, as shown at step 309. The batch ID 146, in the exemplary configuration, is returned by the API 184 with the first update section 154 of the transaction, and is employed by successive update sections 154 to group all update sections 154 via the batch section mapper 142. The batch section mapper 142 stores the unit of work 144 associated with each update section for each update section 154 in the transaction, as depicted at step 310.

The management application 130 processes the update section 154 in the managed object database 140 by applying the updates in the update section 154, as shown at step 311. The managed object database 140 is operable to process each of the plurality of the update sections 154 collectively defining the transaction 150, therefore maintaining the managed object DB 140 in a state reflective of the manageable entities 112 of the SAN 110. Upon processing the update section 154, the management application 130 invokes the DB listener 160 to identify and receive events 180 corresponding to a batch ID 146, as disclosed at step 312. Changes to the managed object database 140 resulting from each subtransaction 156 generate events 180 propagated to the server 120 for receipt by the processes of the management application 130. Therefore, each of the update sections 154 results in at least one change to the managed object database 140; in response the MODB 140 generates an event 180 for each change in the managed object database 140, as shown at step 313.

The management application 130 continues processing the incoming update sections 154. Concurrently, events are generated for previous update sections 154. Accordingly a check is performed, at step 314, to determine if events 180 have been generated. If not, control reverts to step 304 to continue receiving update sections 154 in the transaction 150. If an event occurs, the DB listener 160 employs the comparator 162 to detect occurrences of the listened-for event matching the event type in the registration request for any previously registered event types (above at step 300), as depicted at step 315. The DB listener 160 receives the event at step 316, and suppresses events 180 indicative of the update section 154 pending completion of each of the update sections 154 corresponding to the transaction 150, such that the suppressed events 180 are operable to be released upon processing of each update section in the transaction 150, as depicted at step 317.

The DB listener 160 selectively identifies events 180 based on the batch ID, as depicted at step 318. A check is performed, at step 319, to determine if the event 180 matches a batch ID 146 of a previously received update section 154. In the exemplary configuration, the discriminator 164 employs the batch section mapper 142 to receive information mapping the UOW 144 of the received event 180 to the batch Ids 146 corresponding to received update sections 154. Alternate configurations may employ other mechanisms for tagging events and determining corresponding update sections 154. If the event 180 does not correspond to received transactions 150 (i.e. does not match any update sections 154), then the DB listener 160 selectively transmits the listened-for event based on whether the event corresponds to an update section 154, as shown at step 320. The DB listener 160 propagates, if the event 180 does not correspond to an update section 154, the event to registered processes adapted to receive the event 180, shown by arrow 174, as depicted at step 321.

If the received event does correspond to an update section 154, then the DB listener 160 caches the event 180 by suppressing, if the event 180 corresponds to completion of processing an update section, propagation of the event, as disclosed at step 322. In the exemplary arrangement, suppressing includes storing events in a queuing area, as depicted at step 323, shown by arrow 172. In the exemplary configuration, the DB listener 160 suppresses events 180 corresponding to the transaction 150 based on the batch ID 146, as depicted at step 324.

For each transaction, the management application 130 receives the sequence of update sections 154-1 . . . 154-N that define the transaction 150. Accordingly, the management application 130 waits for an indication of completion of each subtransaction defining the transaction, as depicted by the check at step 325. If no completion indication is received, then control reverts to step 304 to receive successive update sections 154. If all update sections 154 including all subtransactions 156 have been sent by the agent 118, then the agent 118 sends an indication of transmission of each of the update sections included in the transaction 150, as depicted at step 326. The management application 130 receives the transaction completion 150' indicating completion of each of the update sections 154 in the transaction 150. The transaction completion 150' may be an indication of completion of each subtransaction in aggregate, or may be a separate notification of transaction completion from an agent, sent as a separate message after all update sections 154 are sent.

It should be noted that the exemplary configuration depicted as a sequence of steps may include concurrent operations. For example, in the exemplary arrangement, events 180 corresponding to the MODB updates 154 are ongoing as additional update sections 154 are received. The DB listener 184 need not wait for a particular event before proceeding with the next update section, but rather may process the update sections 154 and events 180 in a concurrent or real-time manner as they arrive. Further, multiple transactions 150 may occur simultaneously, each assigned a separate batch ID 146. The management application 130 identifies the individual update sections 154 according to the store process 138 that receives them and the batch ID 146 to UOW 144 mapping maintained by the batch section mapper 142.

In the exemplary configuration, a subtransaction optimization operation mitigates redundant and cumulative updates by examining each of the update sections in the transaction, and consolidating multiple updates to the same database object such that a single event reflects the change to the object, as shown at step 328. Therefore, multiple similar updates to the same storage device (storage object), and updates that reverse a previous update (moot) to the same storage device 115 are identified and removed.

The management application 130 releases the suppressed events 183 from the queuing area (event repository 182) for dissemination to other processes in the management application 130, as shown at step 329. The batch section mapper 142 identifies the suppressed events 183 from the stored units of work 144 associated with the batch ID 146, as depicted at step 329. The event repository 184 releases events 183 corresponding to the batch ID 146 upon receiving the transaction completion indicative of completion of the transaction 150 corresponding to the batch ID 146, as shown at step 331. Upon release, the management application 130 propagates each of the suppressed events 183 corresponding to the transaction, as shown by arrow 190, as depicted at step 332.

In the exemplary configuration, the API is invoked so that individual update sections may be retracted or backed out. Such an arrangement identifying an inconsistency with a particular update section, and computes the unit of work (UOW) associated with the particular update section. The API is invoked using the UOW to perform a rollback based on the unit of work to reverse the stored section update.

As indicated above, the exemplary operations for generating a batch ID to begin a series of update sections, adding events corresponding to additional update sections to the event repository, and releasing the suppressed events are performable via an API 184 invoked from the management application 130 and the DB listener 160. In an exemplary configuration the API may be as follows:

is EventBatchingEnabled( )
    boolean is EventBatchingEnabled( )
    returns enableEventBatching property value.
startEventBatch
    CacheListenertResult startEventBatch(String batchLabel)
    startEventBatch method registers a new batch to collect the events for. A unique butch id is created for the batch. The batch label given as the parameter is used for creating batch id. The unique batch id is returned in the CacheListenertResult.
addBatchSection
    CacheListenertResult addBatchSection(String batchId, UnitOfWork uow)
    addBatchSection method registers a new batch section. The section's uow identifies the section.
removeBatchSection
    CacheListenerResult removeBatchSection(UOW sectionUow)
    removeBatchSection identifies the batch section by its UOW given as a parameter and cleans all accumulated cache events for the section. It also removes association of the section's UOW with the batch id.
commitEventBatch
    CacheListenerResult commitBatch(String batchId)
    commitBatch identifies the batch by batchId given as a parameter and sends all accumulated for the batch cache events.
rollbackEventBatch
    CacheListenerResult rollbackEventBatch(String batchId)
    rollbackEventBatch identifies the batch by batchId given as a parameter and cleans all cache events related to the batch. It also cleans all relations between the batch and its sections.

The aforementioned API invocations are exemplary; other and additional calls may be apparent to those of skill in the art.

Those skilled in the art should readily appreciate that the programs and methods for atomic transaction and event processing as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for atomic transaction and event processing has been particularly shown and described with references to embodiments thereof, it will be understood by those skilled in the art that various changes in form and details may be made therein without departing from the scope of the invention encompassed by the appended claims.

What is claimed is:

1. A tangible computer program product having a computer readable storage medium operable to store computer program logic embodied in computer program code encoded thereon for atomic processing of partitioned event data in a storage area network (SAN) comprising:
   computer program code for receiving an update section, the update section including at least one subtransaction of a transaction;
   computer program code for processing the update section in a managed object database, the managed object database operable to process a plurality of the update sections collectively defining the transaction;
   computer program code for receiving a registration request from a process, the registration request including an event type that the requesting process is listening for;
   computer program code for detecting occurrence of the listened-for event matching the event type in the registration request;
   computer program code for selectively transmitting the listened-for event based on whether the event corresponds to an update section; and
   computer program code for suppressing events indicative of the update section pending completion of each of the update sections corresponding to the transaction, the suppressed events operable to be released upon processing of each update section in the transaction, wherein each of the update sections results in at least one change to the managed object database, further comprising:
      computer program code for generating an event for each change in the managed object database;
      computer program code for suppressing, if the event corresponds to completion of processing an update section, propagation of the event, suppressing including storing events in a queuing area;
      computer program code for propagating, if the event does not correspond to an update section, the event to registered processes adapted to receive the event;
      computer program code for waiting for an indication of completion of each subtransaction defining the transaction; and
      computer program code for releasing suppressed events from the queuing area for dissemination upon the indication of completion.

2. A method of processing event data in a storage area network (SAN) comprising:
   receiving an update section, the update section including at least one subtransaction of a transaction;
   processing the update section in a managed object database, the managed object database operable to process a plurality of the update sections collectively defining the transaction;
   suppressing events indicative of the update section pending completion of each of the update sections corresponding to the transaction, the suppressed events operable to be released upon processing of each update section in the transaction; wherein each of the update sections results in at least one change to the managed object database:
   generating an event for each change in the managed object database;
   suppressing, if the event corresponds to completion of processing an update section, propagation of the event;
   propagating, if the event does not correspond to an update section, the event to registered processes adapted to receive the event;
   receiving a transaction completion indicating completion of each of the update sections in the transaction; and
   propagating each of the suppressed events corresponding to the transaction.

3. The method of claim 1 comprising:
   receiving an update section indicative of updates to at least one storage device in a storage array, the update section comprising a subtransaction of a transaction, wherein the update section corresponds to a portion of a transaction, the transaction operable to be reported as an atomic occurrence.

4. The method of claim 3 further comprising:
   receiving a registration request from a process, the registration request including an event type that the requesting process is listening for;
   detecting occurrence of the listened-for event matching the event type in the registration request; and
   selectively transmitting the listened-for event based on whether the event corresponds to an update section.

5. The method of claim 4 further comprising:
   suppressing includes storing events in a queuing area;
   waiting for an indication of completion of each subtransaction defining the transaction; and
   releasing suppressed events from the queuing area for dissemination upon receipt of the indication of completion.

6. The method of claim 5 wherein the indication of completion of each subtransaction is a notification of transaction completion from an agent, further comprising:
   gathering, from an agent in communication with a storage array, each of the subtransactions occurring at the storage array;
   building a series of update sections comprising a transaction, the series of update sections collectively including each of the gathered subtransactions;
   sending, from the agent, each of the update sections included in the transaction;
   sending an indication of transmission completion of each of the update sections included in the transaction.

7. The method of claim 1 wherein each of the subtransactions corresponds to a unit of work performed by updating the managed object database, each unit of work defining an atomic activity within the managed object database.

8. The method of claim 7 further comprising:
   defining a batch ID corresponding to a transaction
   associating each update section of the transaction with the batch ID
   suppressing events corresponding to the transaction based on the batch ID; and
   releasing events corresponding to the batch ID upon receiving the transaction completion indicative of completion of the transaction corresponding to the batch ID.

9. The method of claim 8 further comprising:
   storing a unit of work associated with each update section for each update section in the transaction;
      identifying suppressed events from the stored units of work associated with the batch ID.

10. The method of claim 9 further comprising:

invoking a listener to identify and receive events corresponding to a batch ID; and selectively identifying events based on the batch ID.

11. The method of claim 10 further comprising:

identifying an inconsistency with a particular update section;

computing the unit of work associated with the particular update section; and performing a rollback based on the unit of work to reverse the stored section update.

12. The method of claim 10 further comprising:

examining each of the update sections in the transaction; and consolidating multiple updates to the same database object such that a single event reflects the change to the object.

* * * * *